Patented Apr. 24, 1923.

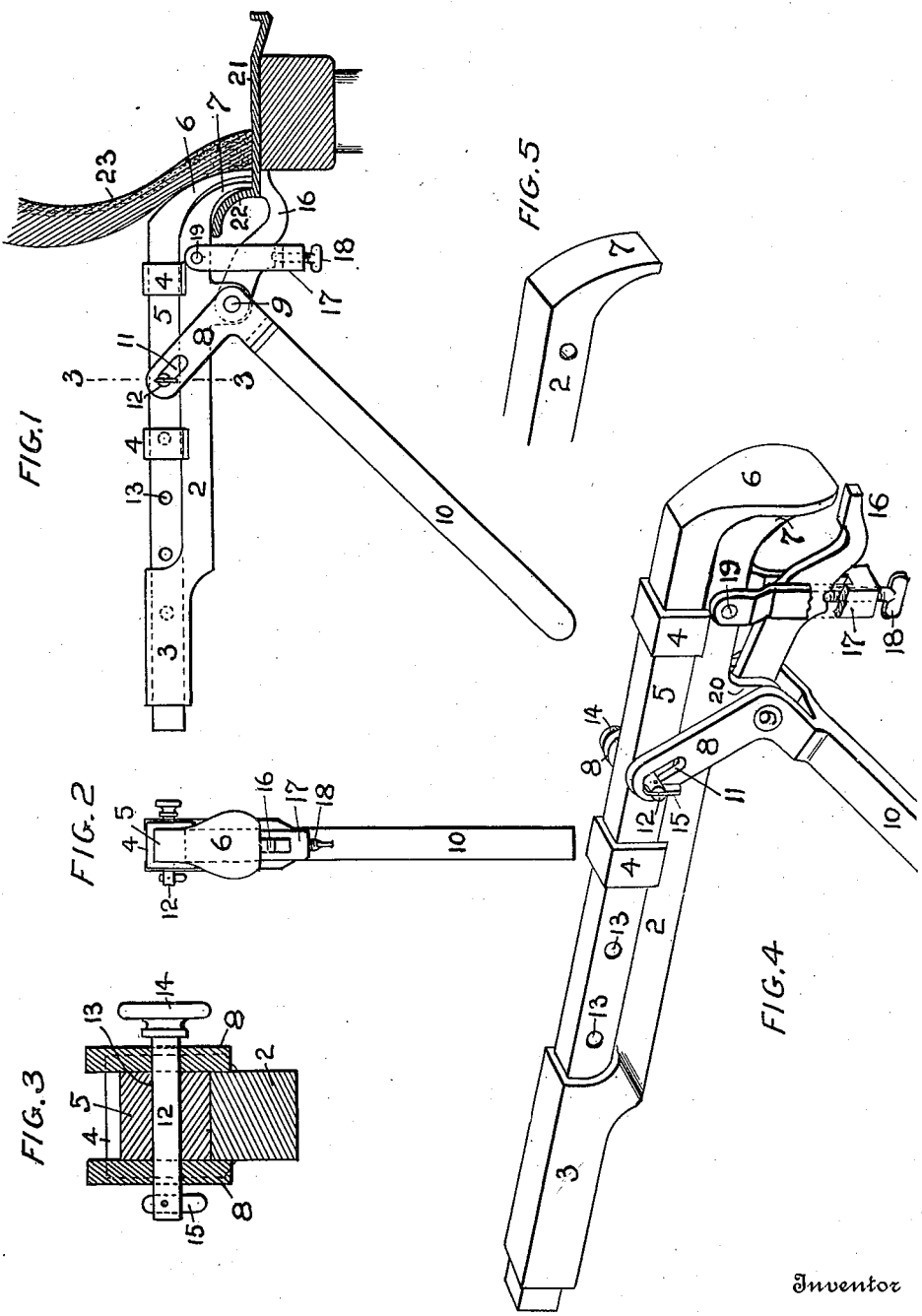

1,452,596

UNITED STATES PATENT OFFICE.

LEON DE FERNELMONT, OF PATERSON, NEW JERSEY.

TIRE TOOL.

Application filed September 10, 1921. Serial No. 499,790.

*To all whom it may concern:*

Be it known that I, LEON DE FERNELMONT, a citizen of the United States, and resident of the city of Paterson, county of Passaic, State of New Jersey, have invented an Improvement in Tire Tools, of which the following is a specification.

My invention has for its object the provision of a special tool adapted for use in removing pneumatic tires from their rims with the least expenditure of time and effort; and, moreover, the tool is so constructed that the removal of the tire may be performed without possible injury thereto or to the rim of the wheel, even where the tire has become "rusted" to the metal rim.

My improved tool is more especially intended for use in removing tires from endless rim bases and upon which the tire becomes firmly seated and difficult of dislodgment.

Heretofore it has been customary to pry the tire off the rim by using a flat bar of steel and by hammering, but this crude manner of dislodging the tire consumed a great deal of time and effort and often resulted in damage to the fabric of the tire and to the rim, especially in cases where tires have become "rusted" to the metal rim or where heavy and large sizes of truck tires are employed, the removal of which is a very difficult matter and especially so when it is necessary to perform the operation on the road without the facilities of a garage equipment.

With the above and other objects in view, the nature of which will be more fully understood from the description hereinafter, the invention consists in the novel construction of a tire tool, as hereinafter more fully described and defined in the claims.

Referring to the drawings: Fig. 1 is a side elevation of my improved tire tool as applied to a wheel rim and tire (in section), illustrating the manner of using the tool; Fig. 2 is an end view of my improved tool; Fig. 3 is a vertical section taken on line 3—3 of Fig. 1, but on a larger scale; Fig. 4 is a perspective view of my improved tool; and Fig. 5 is a perspective view of the end of one of the adjustable bars of the tool.

2 is the main bar of the tool and is provided at one end with a downwardly curved jaw 7 and is further provided along its length with rectangular guide loops 4 and an elongated tubular handle portion 3. 5 is an adjustable bar, preferably of rectangular cross section, and is guided in the looped portions 4 and the tubular handle 3, said bar resting upon the main bar with provision of adjustment longitudinally and relatively thereto. This adjustable bar 5 is provided at one end with a curved jaw 6 which fits snugly against the jaw 7 of the main bar when the two bars are adjusted to bring the jaws 6 and 7 together; whereas, the outer curvature of the jaw 6 is given a larger curvature and is also extended laterally beyond the width of the jaw 7, so as to present a greater surface for contact with the outer rubber surface of the tire shoe 23, as will be understood by reference to Figs. 1 and 4.

The main bar 2 is further provided with downwardly extending lugs 20 carrying a transverse pin 9 which acts as a fulcrum for a bell crank lever 8 having a long handle 10. This bell crank lever 8 is bifurcated at the top so that it straddles the bars 2 and 5 and is connected with the adjustable bar 5 by a transverse pin 12 which extends through a hole 13 in said bar and also through slotted portions 11 in the arms of the bifurcated portion, as will be very clearly understood by reference to Figs. 3 and 4. The pin 12 is provided with a head 14 at one end and is slotted at the other end in which there is pivoted a locking plate 15 which normally prevents the pin from becoming disengaged from the parts 5 and 8, but which, when the plate 15 is turned in alinement with the axis of the pin, will permit the withdrawal of the pin for readjustment in another hole 13 of the bar, should the same be necessary. As will be observed from Figs. 1 and 4, I have shown the bar 5 provided with five transverse holes 13 which would permit great adjustment between the jaws 6 and 7 and which might be called into play for special uses of the tool. Furthermore, by this provision of more than one hole 13, the tool may be made relatively small and yet be suitable for forcing a tire off a very wide rim, such as where double tires are employed in heavy trucks.

Pivoted upon the transverse pin 9 and between the lugs 20 of the main bar 2 is a clamp 16, whose free end is arranged immediately below the jaw 7 of said main bar; said clamp being held up in use by means of a looped strap 17 hinged at 19 to the bar 2 and having at the other end a clamping screw 18. When it is desired to fit the tool to the rim, the screw 18 is lowered and the looped strap 17 is swung backward toward the left in Fig. 1, and thereby permitting the clamp 16 to drop. When, however, the jaw is adjusted to clamping position, the looped strap is swung directly under it and the screw adjusted, as will be clearly understood by reference to Figs. 1 and 4, in which case the tool is clamped to the tire rim 21 immediately adjacent to the outwardly curved portion 22 thereof.

The general operation of the tool may be described as follows: The parts being all as illustrated in Figs. 1 and 4, the screw 18 is lowered, the looped strap 17 moved to the left and the jaw 16 allowed to drop. The lever 10 is then sufficiently lowered to bring the two jaws 6 and 7 snugly together. As the lower ends of the jaws 6 and 7 are relatively narrow, they are forced between the curved rim 22 and the tire 23, and when in this position, the clamp 16 is raised approximately to the underside of the rim. The looped strap 17 is replaced and the screw 18 tightened sufficiently to hold the clamp 16 in such adjustable position without binding upon the rim. The tool is then held to the rim with sufficient positiveness that it cannot be disengaged during the manipulation of the tool and at the same time there is sufficient freedom between the tool and the rim to allow the former to be moved circumferentially about the rim during the operation of removing the tire. When the tool is adjusted as above stated, the lever 10 is raised thereby forcing the adjustable bar 5 toward the tire with the result that the jaw 6 thereof presses the tire laterally over the surface of the rim toward its releasing side, as will be understood by reference to Fig. 1, in which the jaws 6 and 7 are shown as slightly separated in the performance of the initial act in the removal of the tire. In the operation, the tire is slightly removed from the curved edge 22 of the rim for a certain distance along its entire circumference. This distance varies with different tires and is governed largely by the extent to which the initial shifting of the tire is possible on the rim and whereby the lateral adjustment of the tool circumferentially is performed. It will be understood that with heavy tires, the dislodgment with each circumferential operation will be less than where the tire is small and easily moved. After performing the dislodgment for a given distance circumferentially, the tool repeats the operation until the tire is completely displaced from the rim. Where the distance of this movement is greater than the throw of the bar 5 with one connection with the bell crank lever 8, it will be necessary to remove the pin 12 and readjust it to the next hole 13, to enable the proper operation of the jaw 6 when considerably separated from the jaw 7, this provision being necessary where the tool is small, because in some large size truck tires the flat part of the rims frequently measure approximately seven inches transversely, which can be taken care of by reason of this provision of the additional holes 13 and the adjustable pin 12.

I have shown my improved tool embodying the details of construction which I prefer, but it is to be understood that I do not restrict myself to the particular details for, in considering my invention in its broad aspect, it comprises two jaws of the general character 6 and 7, respectively connected to bars having relative longitudinal adjustment for separating the said jaws, one of said bars provided with means for holding the jaws to the tire rim during operation and said jaws jointly cooperating with means whereby they may be given a relative adjustment, all of which will be clearly understood from the foregoing description.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim and desire to secure by Letters Patent is:—

1. In a tire tool, the combination of two bars having an adjustable union whereby one may be adjusted longitudinally with respect to the other, said bars each provided with laterally extending jaws turned in the same direction and adapted to be brought together or separated according to the adjustment of the bars, a suitable clamp having a connection with one of the bars and its free end adapted to be brought into substantial alinement with the jaws when brought together, means for holding the clamp in relative position with respect to the jaws, and manually operated means having a connection with both of the bars for insuring a relative longitudinal adjustment thereto.

2. The invention according to claim 1, wherein the manually operated means comprises an angle lever having long and short arms and hinged to one of the bars at the juncture of the arms, and a mechanical connection comprising a transverse pin extending through the other bar and short arm of the lever whereby the long arm is movable away from the jaws when separating them.

3. The invention according to claim 2, further characterized by one of the bars having a rear guide constituting a tubular handle and the other bar carrying the transverse pin being provided with a plurality of transverse holes with either of which the adjustable pin may have engagement for connection with the lever when providing great separation between the jaws of the respective parts and in which further, the adjustable bar extends greatly to the rear of the rear guide on the other bar and is of a length to permit adjustment without becoming disengaged from the rear guide in the tubular handle.

4. The invention according to claim 1, wherein one of the bars is formed with a tubular handle on its end most distant from its jaw, and in which the other and adjustable bar is extended rearwardly and guided in the handle.

5. The invention according to claim 1, wherein the jaws of the respective bars are curved in the same direction arranged to abut and in which the outer jaw of the adjustable bar is greatly wider than and overlaps the jaw of the other bar laterally in each direction.

6. The invention according to claim 1, wherein the clamp is hinged to one of the bars and held in adjustable relation to and from the jaw of said bar, the adjustable bar having its jaw adjustable relatively to the clamp and in which the adjustable movement of the clamp and of the jaw of the adjustable bar are at substantially right angles.

7. The invention according to claim 1, wherein the clamp is hinged on a transverse axis to one of the bars and having its free end movable to and from the jaw thereof, and further wherein the means for holding the clamp in clamping position comprises a looped strap hinged to the bar to which the clamp is hinged and adapted to be swung to positions which will permit the clamp to drop on the one hand and lock it in definite position with respect to the jaw on the other hand.

8. The invention according to claim 7, wherein the looped strap is provided with an adjusting screw for adjusting the free end of the clamp relatively to the jaw of the bar to which it is hinged.

In testimony of which invention, I hereunto set my hand.

LEON DE FERNELMONT.